United States Patent [19]

Long et al.

[11] Patent Number: 4,621,754

[45] Date of Patent: Nov. 11, 1986

[54] TOOL AND METHOD FOR CLEAVING OPTICAL FIBERS

[75] Inventors: Eric L. Long, Northbrook; Anton Brey, Chicago, both of Ill.

[73] Assignee: Switchcraft, Inc., Chicago, Ill.

[21] Appl. No.: 455,383

[22] Filed: Jan. 3, 1983

[51] Int. Cl.[4] ............................................. C03B 37/16
[52] U.S. Cl. .......................................... 225/96; 225/2
[58] Field of Search ............................ 225/2, 96, 96.5; 29/469; 83/879–887

[56] References Cited

U.S. PATENT DOCUMENTS

| | | | |
|---|---|---|---|
| 4,203,539 | 5/1980 | Miller | 225/2 |
| 4,216,004 | 8/1980 | Brehm et al. | 225/96.5 |
| 4,229,876 | 10/1980 | Doty | 29/469 |
| 4,245,537 | 1/1981 | Curtis | 83/879 |
| 4,368,948 | 1/1983 | Despouys | 350/96.20 |
| 4,413,763 | 11/1983 | Lukas | 225/2 |
| 4,450,995 | 5/1984 | Leiby | 225/96.5 |

OTHER PUBLICATIONS

T & B Optoelectronics (12/80)"Fiber Optic Cleaving Tool for Glass Optical Fibers".
The Fujikura Cable Works, Ltd. Tokyo, Japan "Operation Manual of Fiber Cleaver Model CT-02".

*Primary Examiner*—James M. Meister
*Assistant Examiner*—John L. Knoble
*Attorney, Agent, or Firm*—John T. Meaney; R. M. Sharkansky

[57] ABSTRACT

An optical fiber cleaving tool comprising a base supporting a sled which is biased to carry an optical fiber clamp thereon away from an inner surface of an orthogonal end wall having extending through it in alignment with the clamp an aperture disposed to receive a fiber optic connector end portion. The connector has a terminal end surface provided with a central aperture through which an optical fiber end portion extends to the clamp on the sled for axial tensioning. Aligned with the aperture in the wall is a recess having an end surface chordally disposed with respect to the aperture for abutting engagement with the terminal end surface of the connector and serving as a reference plane. A cutter rotatably mounted above the recess end surface has a peripheral portion from which protrudes resiliently a diamond-tipped end portion of a wafer-like blade which is slidably disposed in a slot extending diametrically of the disc and having a thickness greater than the thickness of the blade. A leaf spring overlying the slot has a flexible end portion bearing against an underlying ball which presses resiliently on the wafer-like blade in the slot to urge it laterally into resilient contacting relationship with the terminal end surface of the connector for nicking the optical fiber at a transverse plane disposed in predetermined positional relationship with the terminal end surface of the connector.

10 Claims, 22 Drawing Figures

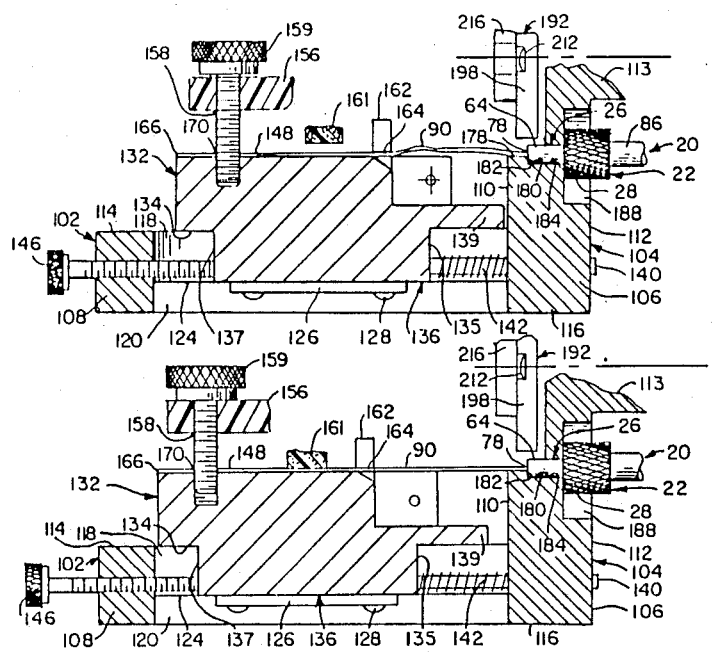
FIG. 11A
FIG. 11B
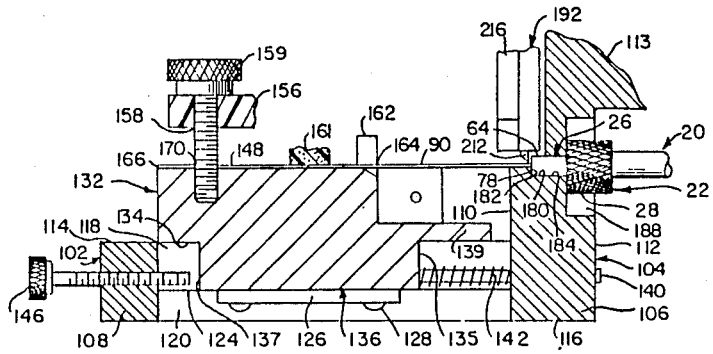
FIG. 11C
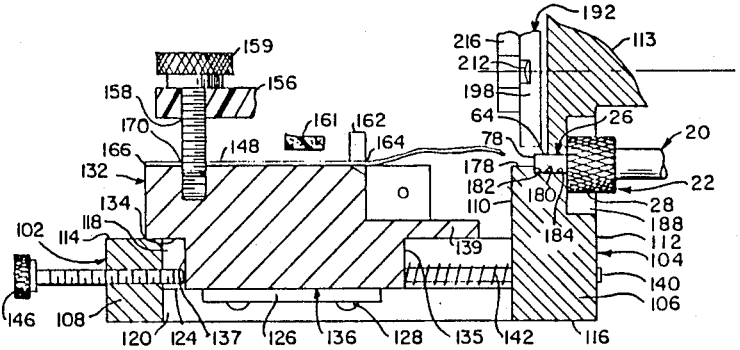
FIG. 11D
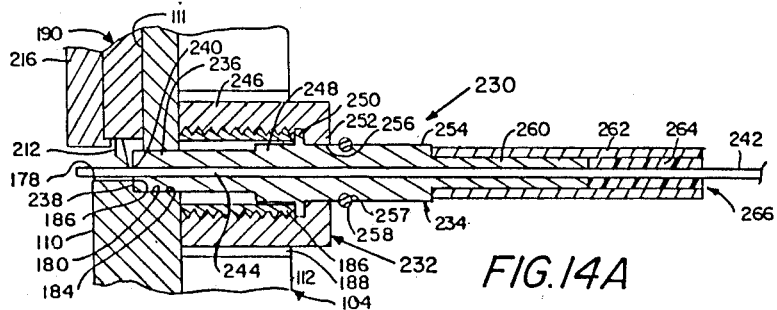
FIG. 14A
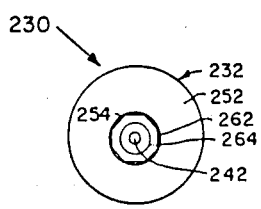
FIG. 14B

TOOL AND METHOD FOR CLEAVING OPTICAL FIBERS

BACKGROUND OF THE INVENTION

1. Field of the Invention

This invention relates generally to fiber optic terminations and is concerned more particularly with method and means for cleaving an optical fiber element of a fiber optic cable.

2. Discussion of the Prior Art

A fiber optic cable of the single conduit type comprises a filamentary optical fiber made of flexible light-pipe material, such as glass, for example, and provided with a buffer coating of flexible material, such as opaque plastic material, for example. The coated optical fiber may be laid axially with a stiffening wire of flexible tension-absorbent material, such as steel, for example; and the combination encircled by a protective jacket of flexible material, such as a rugged plastic material, for example. Thus, the single conduit fiber optic cable resembles, in appearance, a single conductor electrical cable having an insulation coated wire and an uninsulated ground wire encircled by a protective jacket of flexible material.

This similarity of the single conduit fiber optic cable to the single conductor electrical cable also may extend to its use and installation. For example, the optical fiber element of the fiber optic cable may be employed for transmitting informational data from a source to a receptor device in the form of light pulses, just as the insulation coated wire of the electrical cable may be employed for conducting the informational data by means of electrical pulses. Also, the single conduit fiber optic cable may have its end portions secured to respective connectors for coupling the optical fiber element to the source and to the receptor device to transmit light energy efficiently from the source to the fiber optic cable and from the fiber optic cable to the receptor device. Furthermore, when the source is located from the receptor device a distance greater than the length of one fiber optic cable, a coupler device may be provided for coupling a connector at one end of the fiber optic cable to a connector at an adjacent end of another fiber optic cable in a manner which promotes the efficient transmission of light energy from one to the other of the fiber optic cables.

To minimize losses in light energy entering and leaving the fiber optic cable, the terminal end surfaces of the optical fiber generally are made mirror-flat, as by polishing, for example, and are disposed substantially perpendicular to the axis of the fiber. Also, in order to maintain these end surfaces mirror-flat and perpendicular, as described, the terminal end surfaces of the optical fiber are not disposed in butting engagement with a connecting component but, instead, are spaced therefrom a predetermined distance, such as one to ten thousandths of an inch, for example. Consequently, after the terminal end surfaces of the optical fiber have been prepared, as described, the connectors generally are mounted on respective end portions of the fiber optic cable and secured to the optical fiber, as by bonding, for example. As a result, the terminal end surfaces of the optical fiber are fixed in relation to preselected portions, such as positive-stop shoulders, for example, of the connectors which ensure that the terminal end surfaces will be spaced the predetermined distances from the connecting components.

Since the polishing process for preparing the terminal end surfaces of the optical fiber does not lend itself very readily to use in the field, there has been developed in the prior art a number of field tools for cleaving the glass optical fiber in a plane transverse to the axis of the fiber. However, these prior art cleaving tools generally are designed for cleaving the optical fiber before securing the connector, as by bonding, for example, to the cleaved end portion of the optical fiber. Consequently, it is necessary to secure the connector, in the field, to the cleaved end portion of the optical fiber such that the resulting terminal end surface is fixed a predetermined distance from a preselected portion of the connector. Also, some of the prior art cleaving tools cause the glass optical fiber to break in a transverse plane by sharply bending the fiber or unduly stressing the glass material. As a result, cracking or chipping may occur subsequently at the cleaved end portion of the optical fiber and cause prohibitive losses in light energy entering or leaving the fiber optic cable.

SUMMARY OF THE INVENTION

Accordingly, these and other disadvantages of the prior art are overcome by this invention providing an optical fiber cleaving tool with coupling means for securing to the tool a fiber optic connector and fixing in place a terminal end surface of the connector from which extends an end portion length of an optical fiber. The optical fiber cleaving tool of this invention also is provided with optical fiber clamping means for maintaining the end portion length of the optical fiber under tension during the cleaving operation. Furthermore, the optical fiber cleaving tool of this invention is provided with resiliently biased cutter means for moving into nicking engagement with the tensioned end portion length of the optical fiber to break the fiber cleanly at a predetermined transverse plane, even when said transverse plane lies within a dish-shaped terminal end surface of the connector.

A preferred embodiment of this optical fiber cleaving tool may comprise a slab-like base supporting at one end portion thereof an orthogonal wall having an inner surface facing the opposing end portion of the base and having an opposing outer surface. The outer surface of the wall is provided with a threaded collar which encircles an outer end portion of an aperture extending transversely through the wall and terminating at a chordally disposed edge portion of a positive-stop shoulder provided on the inner surface of the wall. Thus, a fiber optic connector may have an axially protruding ferrule inserted into the hole in the wall and have an encircling shell journalled onto the threaded collar until a terminal end surface of the ferrule is brought into abutting relationship with the chordally disposed edge portion of the positive-stop shoulder thereby fixing the terminal end surface of the ferrule in place.

The base of the tool may slidably support on its surface adjacent the inner surface of the wall a block-like sled which is resiliently biased to slide away from the inner surface of the wall and carries the clamping means for maintaining an end portion length of an optical fiber extending axially from the end surface of the ferrule under tension during the cleaving operation. Also, the inner surface of the wall may have rotatably supported thereon a cutter disk provided with a radially protruding cutting blade which is movable into nicking relationship with the tensioned end portion of the optical fiber at a predetermined transverse plane. The cutting blade is resiliently biased in the radial direction for nicking the optical fiber sufficiently to cause it to break under tension and provide the fiber with a mirror flat end surface which is substantially perpendicular to the axis of the fiber. The cutter blade also is resiliently biased in the lateral direction for passing over the circular rim of a disk-shaped end surface of the ferrule and nicking the optical fiber as described at a transverse plane within the volume defined by the concave curvature of the dish-shaped end surface.

BRIEF DESCRIPTION OF THE DRAWINGS

For a better understanding of this invention, reference is made in the following detailed description to the accompanying drawings wherein:

FIGS. 11a–11d are schematic views showing method steps involving the use of the cleaving tool shown in FIGS. 5 and 6;

FIG. 14A is a fragmentary axial sectional view of an alternative fiber optic connector assembly mounted in the cleaving tool shown in FIGS. 5 and 6;

FIG. 14B is an elevational end view of the alternative fiber optic assembly shown in FIG. 14A.

DESCRIPTION OF THE PREFERRED EMBODIMENTS

Figure 1:
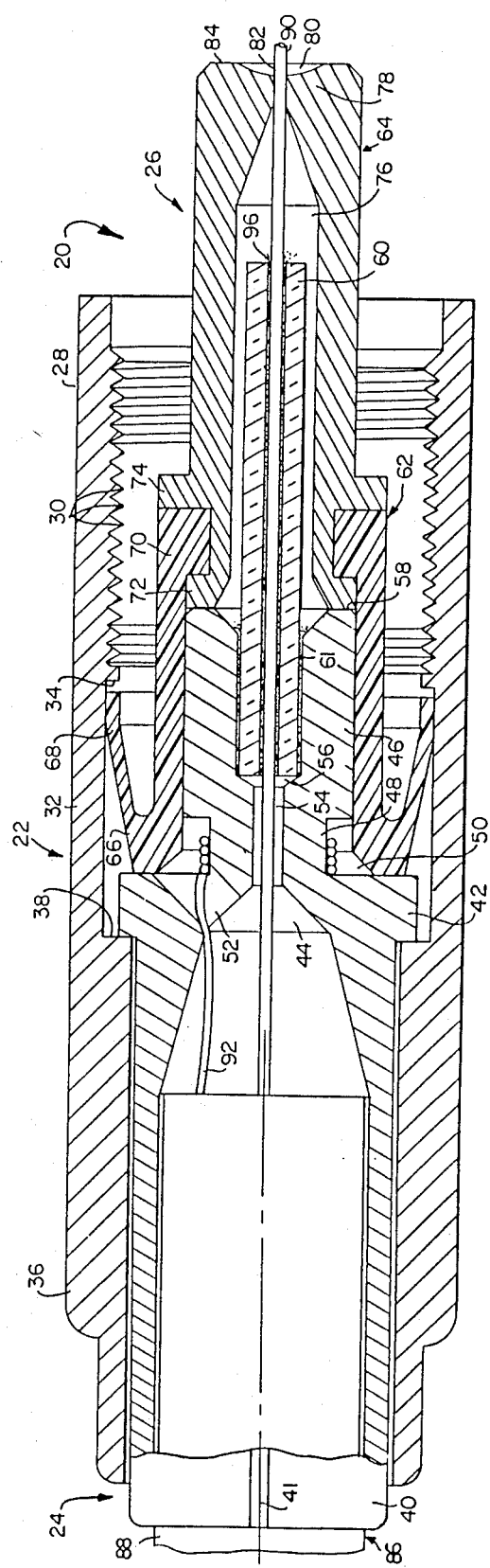
FIG. 1 is an axial view, partly in section, of a fiber optic connector mounted on a stripped end portion of a fiber optic cable.

Referring to the drawings wherein like characters of reference designate like parts throughout the several views, there is shown in FIG. 1 a fiber optic connector assembly 20 comprised of a tubular outer shell 22 protectively encircling an axially disposed bushing 24 and an aligned ferrule 26. Shell 22 may be made of rigid material, such as brass, for example, and may be of the axially rotatable type having a coupling end portion 28 provided with internal threads 30. The threads 30 extend toward a midportion 32 of the shell 22 and terminate adjacent an internal annular shoulder 34 thereof. Shell 22 has an opposing end portion 36 provided with a thickened wall which terminates adjacent the midportion 32 in an internal annular shoulder 38.

Bushing 24 has protruding axially from the end portion 36 of shell 22 a split-sleeve end portion 40 which is made of suitable material, such as steel, for example and has a narrow slit 41 longitudinally disposed therein. The end portion 40 extends along the inner surface of shell end portion 36 and is integrally joined to a transversely disposed flanged portion 42 which extends radially outward of the bushing 24 for butting engagement with the internal annular shoulder 38. Flanged portion 42 also extends radially inward of the bushing 24 and has axially disposed in it a frusto-conical bore 44. The larger diameter end portion of bore 44 has a sloped wall surface merging integrally with an inwardly tapering inner wall surface of the split-sleeve end portion 40. Flanged portion 42 is integrally joined to a smaller outer diameter socket portion 46 of bushing 24 through an interposed neck portion 48 of still smaller outer diameter. Thus, the outer cylindrical surface of neck portion 48, in conjunction with adjacent radially extending surfaces of the flanged portion 42 and the socket portion 46, forms an annular channel 50 in the outer surface of bushing 24. At the juncture of the radially extending outer surface of flanged portion 42 forming channel 50 and the outer cylindrical surface of neck portion 48 there is disposed an aperture 52 which extends obliquely through the flanged portion 42 from the sloped wall surface of frusto-conical bore 44.

The frusto-conical bore 44 has a small diameter end communicating through an axial bore 54 in neck portion 48 with an aligned cylindrical cavity 56 in socket portion 46. Cavity 56 has an outwardly tapered open end centrally disposed in a terminal end surface 58 of the socket portion 46, and has slidably inserted therein an end portion of an axially extending tube 60 made of vitreous material, such as glass, for example. The inserted end portion of glass tube 60 has applied thereto, prior to insertion, an epoxy adhesive coating 61 which cures after insertion to secure the glass tube 60 fixedly to the socket portion 46 of bushing 24. Alternatively, the inserted end portion of glass tube 60 may be fixedly secured to the encircling socket portion 46 by other means, such as glass cement or conventional glass-to-metal sealing techniques, for examples. Glass tube 60 extends axially through the coupling end portion 28 of shell 22 and is encircled by the ferrule 26.

Ferrule 26 has a cup-like end portion 62 made of flexible material, such as a suitable plastic material, for example which is secured, as by molding, for example, to a very small diameter tubular portion 64 made of rigid material, such as brass, for example. The cup-like end portion 62 has an axially extending wall telescopically encircling the socket portion 46 of bushing 24 and an outwardly tapering rim 66 which is disposed for butting engagement with the flanged portion 42 of the bushing 24. Integrally joined to the rim 66 is a reentrant annular skirt 68 which flares radially outward of the cup-like end portion 62. Skirt 68 terminates in a circular rim which is disposed for butting engagement with the internal annular shoulder 34 of shell 22. The axially extending wall of cuplike end portion 62 is integrally joined at its other end to a transversely disposed annular bottom wall 70 of the cuplike end portion 62.

Annular bottom wall 70 extends radially inward of the cup-like end portion 62 and is supported between an annular end flange 72 and an axially spaced annular flange 74 which extend radially outward of the tubular end portion 64. The end flange 72 is disposed for butting engagement with the terminal end surface 58 of bushing socket portion 46, and encircles an outwardly tapered end of an axial bore 76 in the tubular end portion 64. Bore 76 communicates with the tapered open end of cavity 56 in socket portion 46 and receives an axially projecting end portion of glass tube 60. The tube 60 extends axially along the bore 76 in tubular end portion 64 and towards the opposing end thereof which is closed by transversely disposed end wall 78 having a dish-shaped outer surface 80. Surface 80 curves concavely outward from a central aperture 82, which extends axially through the end wall 78 and has an inner end encircled by an inwardly tapering end of bore 76. The outward curvature of dish-shaped surface 80 terminates in a circular rim 84 which defines a transverse plane spaced axially from the central aperture 82 a distance equivalent to the depth of the concavely curved end surface 80.

Figure 2:
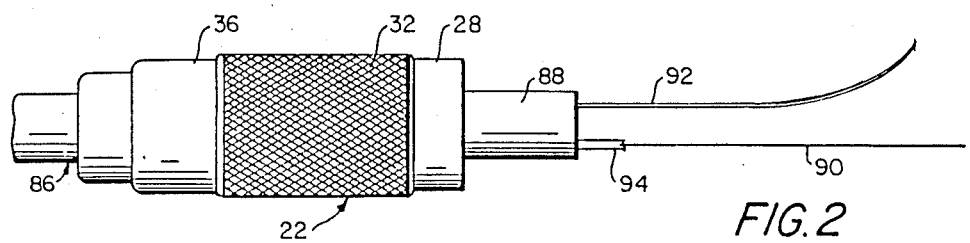
FIG. 2 is an elevational view showing the shell of the fiber optic connector installed on the fiber optic cable.
Figure 3:
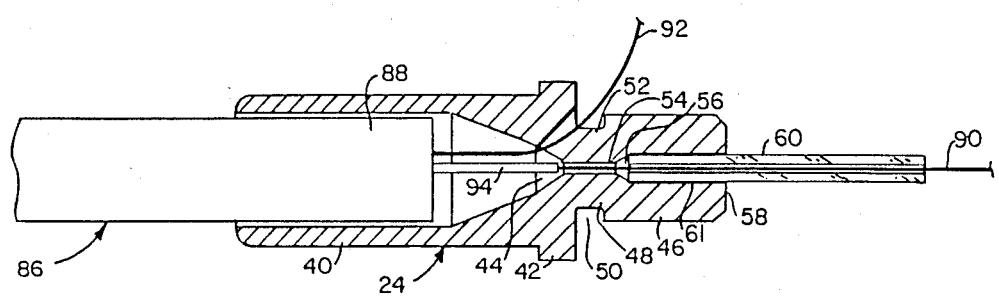
FIG. 3 is an axial view, partly in section, showing the bushing of the fiber optic connector initially installed on the fiber optic cable.
Figure 4:
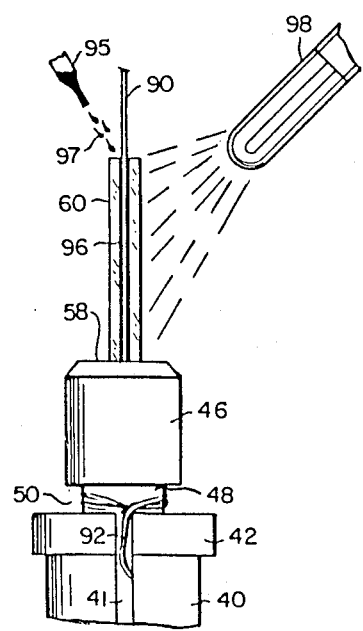
FIG. 4 is a fragmentary elevational view similarly to FIG. 3 but showing the bushing illustrated in FIG. 3 as further installed on the fiber optic cable.
Figure 5:
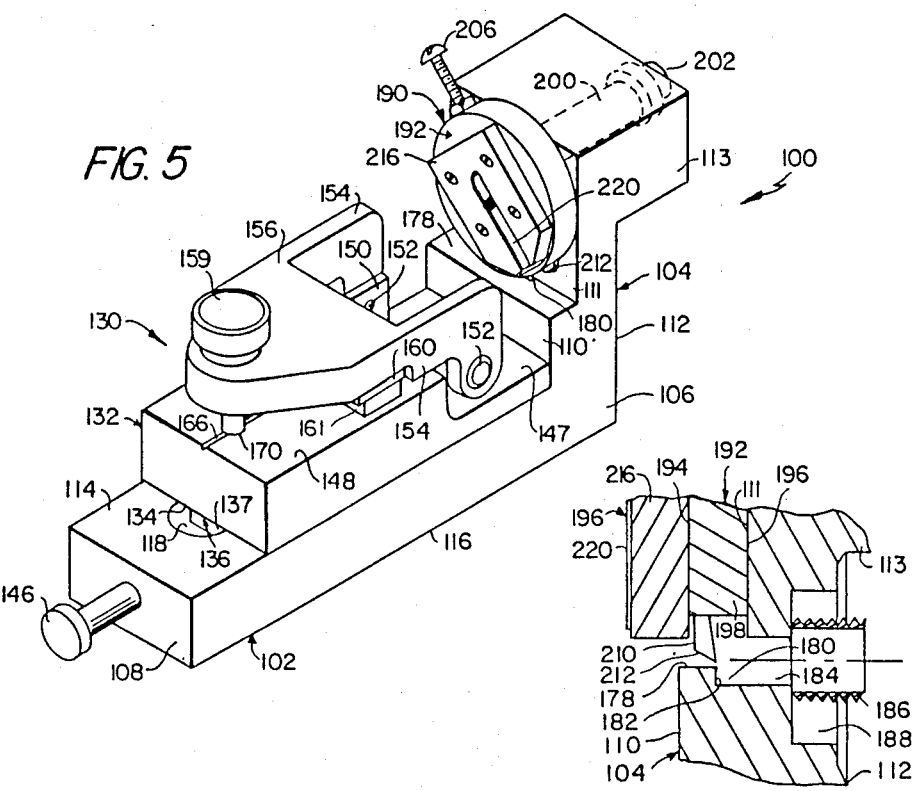
FIG. 5 is an isometric view of an optical fiber cleaving tool for further processing of the installed connector shown in FIG. 1.

FIGS. 2-4 illustrate a method for installing the fiber optic connector assembly 20 as shown in FIG. 1. Initially, the tubular shell 22 may be slid axially onto a fiber optic cable end portion 86 a sufficient distance to avoid interference with subsequent steps of the method. The end portion 86 then may be stripped by removing an end portion of an outer protective jacket 88 in a manner similar to removing an end portion of an outer protective jacket from an electrical cable, for example. As a result, the end portion 86 will be provided with an exposed end portion of an optical fiber 90 made of suitable light conduit materials, such as glass cladding on a glass core or a plastic clad glass core, for examples. The stripped end portion 86 also may be provided with an exposed end portion of a stiffening wire 92 made of flexible tension-resisting material, such as steel, for example.

Alternatively, the tubular shell 22 may be slid axially onto the fiber optic cable end portion 86 after the stripping operation. If the exposed end portion of optical fiber 90 is provided with a buffer coating, such as 94, for example, an end portion length of the buffer coating 94 is stripped off in a manner similar to stripping an end portion of insulation from an insulated electrical conductor, for example. Also, if the resulting bare end portion of optical fiber 90 is provided with a film-like coating (not shown) of tacky material, such as a resinous material, for example, the film-like coating is cleaned off the bare end portion of optical fiber 90, as by use of a very fine abrasive cleanser and a soft drying tissue, for example, to provide at the fiber optic cable end portion 86 a bare end portion of the optical fiber 90 having a clean outer surface.

The cable end portion 86 then is inserted axially into the split-sleeve end portion 40 of bushing 24 by passing the bare end portion of optical fiber 90 through the frusto-conical bore 44 in flanged portion 42 while directing the stiffening wire 92 through the aperture 52 in the sloped wall of bore 44. End portion 86 is urged axially to bring its outer jacket 88 into binding engagement with the inwardly tapering surface of split-sleeve end portion 40 adjacent the flanged portion 42. As a result, the bare end portion of optical fiber 90 passes through the axial bore 54 in neck portion 48 and through the glass tube 60 to emerge from the distal end portion thereof. The stiffening wire 92 extends through the aperture 52 and, after being pulled taut, is wound at least two turns around the outer surface of neck portion 48. The remaining end portion of stiffening wire 92 is bent longitudinally back along the cable end portion 86 and directed into the longitudinal slit 41 in split-sleeve end portion 40 for securing it between the split-sleeve end portion 40 and the outer jacket 88 of cable end portion 86. If desired, an epoxy adhesive material may be applied, as by a brush, for example, along the longitudinal slit 41 in split-sleeve end portion 40 and to the terminal end thereof. Thus, a tensile force applied axially to the cable end portion 86 is resisted by the stiffening wire 92 wrapped around the neck portion 48 rather than by the bare end portion of optical fiber 90 extending axially through the glass tube 60.

When the stiffening wire 92 is secured as described, the bushing 24 is held upright in the position where the bare end portion of optical fiber 90 emerging from the glass tube 60 extends upwardly. Then, an applicator 95, such as an eye dropper or a hypodermic needle, for example, is disposed for directing ultra-violet sensitive bonding material 97, such as DYMAX U.V. X103-58B sold by American Chemical And Engineering Company of Harwington, Conn., for example, between inner surface of glass tube 60 and the encircled outer surface of optical fiber 90. The bonding material 97 flows downwardly between the glass tube 60 and the optical fiber 90 and forms an interposed layer 96 of the bonding material. The material of layer 96 is cured by directing ultra-violet light from a suitable source 98, such as a probe lamp of the fluorescent type manufactured by Demetron Research Corporation of Danbury, Conn., for example, at an angle of about forty-five degrees onto the glass tube 60. Thus, it may be seen that the glass tube 60 preferably is made of a glass material, such as soda lime glass, for example, which is transparent to ultra-violet light. The ultra-violet light passing through the glass tube 60 from source 98 cures the ultra-violet sensitive bonding material 97 in less than five minutes, such as one minute typically, for example, which is especially suitable for field use. As a result, the layer 96 of cured bonding material fixedly secures the glass tube 60 to the encircled bare portion of optical fiber 90.

Also, from the foregoing it may be seen that the end portion of glass tube 60 in cavity 56 of socket portion 46 is fixedly secured therein by a means, such epoxy bonding material, glass cement or a conventional glass-to-metal fusing technique, for examples, which is not sensitive to the ultra-violet light directed onto glass tube 60 from source 98. Therefore, the glass tube 60 preferably is fixedly attached to the socket portion 46 of bushing 24 at the factory so that, in the field, the bushing 24 is delivered as a unitary component having the vitreous end portion 60 attached and prepared for bonding to the bared end portion of optical fiber 90. Consequently, the described steps of sliding the connector shell 22 on cable end portion 86, installing the bushing 24 as described, and bonding the bared end portion of optical fiber 90 to the vitreous end portion of bushing 24 can be accomplished in the field very rapidly.

Subsequently, the bared end portion of optical fiber 90 extending from glass tube 60 is inserted, as shown in FIG. 1, into the tapered open end of bore 76 in ferrule 26 and is threaded through the aperture 82 centrally disposed in the end wall 78 having the dish-shaped outer surface 80. Then, the connector shell 22 is slid back along cable end portion 86 until the internal shoulder 38 thereof abuts the flanged portion 42 of bushing 24. The cup-like end portion 62 of ferrule 26 is urged axially into the coupling end portion 28 of shell 22 by means of the outwardly flared skirt 68 flexing to pass over the crests of internal threads 30 and expanding radially outward once it moves past the internal annular shoulder 34. When the circular rim of cup-like portion 62 is brought into abutting relationship with the end surface 58 of socket portion 46, the ferrule 26 is fully installed to form the fiber optic connector assembly 20 shown in FIG. 1. However, there still remains the task of providing means readily adapted to field use for terminating the bare end portion of optical fiber 90 extending from the aperture 82 centrally disposed in the dish-shaped end surface 80 of ferrule 26.

In FIGS. 5-8, there is shown an optical fiber cleaving tool 100 having suitable dimensions, such as four inches long by one inch wide, for example, for hand-held operation, particularly by field service personnel. Tool 100 comprises an elongated block-like base 102 made of rigid lightweight material, such as aluminum, for example, and an orthogonal wall 104 integrally joined to an end portion 106 of the base. The wall 104 has an inner surface 110 facing an opposing end portion 108 of the base, and has an opposing outer surface 112. Base 102 has a generally flat upper surface 114 which is disposed adjacent and substantially perpendicular to the inner wall surface 110 of wall 104. The base 102 also has an opposing bottom surface 116 which may be substantially parallel to the upper surface 114.

Disposed longitudinally in the upper surface 114 of base 102 is an axial slot 118 which extends from the inner surface 110 of wall 104 and terminates adjacent the end portion 108 of the base. Slot 118 extends into the thickness of base 102 and communicates with an underlying coextensive slot 120 extending into the thickness of base 102 from the bottom surface 116 thereof. The slot 120 is wider than the slot 118 thereby forming at the juncture of the slots respective coplanar shoulders 122 and 124, each of which extends inwardly from a respective longitudinal edge of slot 120 to the adjacent longitudinal edge of slot 118. Disposed longitudinally in the slot 120 is an elongated plate 126 which transversely spans the slot 118 and has opposing longitudinal edge portions overlapping the surfaces of respective shoulders 122 and 124 for slidable engagement therewith.

Figure 10:
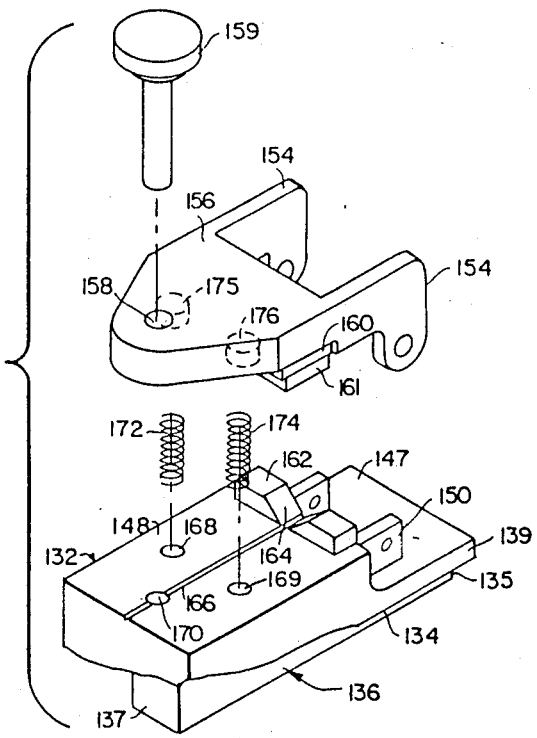
FIG. 10 is an isometric exploded view, partly fragmentary, of the optical fiber clamping means shown in FIGS. 5 and 6.

The base 102 supports a slidable sled 130 comprising an elongated platform-like body 132 made of rigid lightweight material, such as aluminum, for example, and having a width which may be substantially equal to the width of base 102. As shown more clearly in FIG. 10, the platform-like body 132 has a lower surface 134 disposed for slidable engagement with the substantially flat upper surface 114 of base 102. Extending downwardly from a longitudinal central portion of surface 134 is an integral bar-like runner 136 having opposing end surface 135 and 137, respectively. The runner 136 is slidably disposed in the slot 118 and extends from the upper surface 114 of base 102 to the plane of shoulders 122 and 124, respectively. Plate 126 is fastened, as by screws 128, for example, to the runner 136 and holds the lower surface 134 of platform-like body 132 in slidable engagement with the upper surface 114 of base 102.

Extending centrally through the end portion 106 of base 102 is an internally threaded aperture 138 which communicates with the upper slot 118 in the base. The aperture 138 is threadingly engaged by a tension-adjustment screw 140 having a shank end portion extending into the slot 118 and encircled by an end portion of a coil spring 142. The other end portion of coil spring 142 is axially disposed in an open ended cavity 144 which is centrally disposed in the end surface 135 of runner 136. Coil spring 142 exerts a resilient pressure against an opposing closed end of cavity 144 to bias the sled 130 for slidable movement along the base 102 and away from the wall 104. The opposing end surface 137 of runner 136 is disposed for butting engagement with a terminal end surface of a positive-stop adjustment screw 146 which extends threadingly through the end portion 108 of base 102. When the screw 146 is threaded fully into the end portion 108 and bears against the adjacent end surface 137 of runner 136 to overcome the resilient counter-pressure exerted by coil spring 142, the sled 130 is moved slidably toward the wall 104 until a forward end portion 139 of body 132 projecting beyond the runner 136 butts against the inner surface 110 of wall 104.

The platform-like body 132 has a transversely stepped upper surface including a lower level surface portion 147 adjacent the wall 104 and a mesa-like raised level surface portion 148 adjacent the end portion 108 of base 102. Extending upwardly from the lower level surface portion 147 is a fixedly attached pair of spaced parallel lugs 150 which are secured, as by respective pintles 152, for example, to apertured end portions of respective pivotal arms 154. The pivotal arms 154 extend in spaced parallel relationship from one end portion of an integral clamping plate 156 made of rigid lightweight material, such as aluminum, for example. Plate 156 has an opposing rounded end portion provided with a centrally disposed aperture 158 which is engaged by a clamping adjustment screw 159. The under surface of plate 156 overlies the raised level surface portion 148 and is provided with a transversely disposed landing 160 which carries a superimposed coextensive pad 161 of compressible material, such as felt or rubber, for examples.

The raised level surface portion 148 has an end portion adjacent the lower level surface portion 147 which supports an integral upwardly extending ridge 162. Ridge 162 extends transversely of the raised level surface portion 148 and fits between the spaced parallel arms 154. Centrally disposed in the ridge 162 is a V-shaped notch 164 having sloped wall surfaces which converge toward the raised level surface portion 148 and terminate at an optical fiber receiving groove 166. Groove 166 extends longitudinally along a central portion of the raised level surface portion 148 and passes beneath the pad 161 of compressible material.

Disposed in an opposing end portion of the raised level surface portion 148 is a triangular array of apertures 168, 169 and 170, respectively. The apertures 168 and 169 at respective base corners of the triangular array comprise open ends of respective bottomed cavities which have axially disposed therein end portions of respective coil springs 172 and 174. Opposing end portions of the springs 172 and 174 are axially disposed in similar bottomed cavities 175 and 176, respectively, disposed in the under surface of clamping plate 156. Thus, the respective coil springs 172 and 174 exert a resilient pressure against the clamping plate 156 to bias it pivotally away from the raised level surface portion 148. The aperture 170 at the apex of the triangular array is internally threaded to receive the leading end portion of clamping adjustment screw 159 extending through the aperture 158 in the clamping plate 156. Accordingly, the clamping adjustment screw 159 is threaded into the aperture 170 to pivotally move the clamping plate 156 toward the raised level surface portion 148 until the pad 161 is compressed onto the underlying portion of groove 166.

The inner surface 110 of wall 104 extends upwardly from the upper surface 114 of base 102 and terminates at a transverse shoulder 178 which is disposed approximately in the plane of raised level surface portion 148. As shown more clearly in FIG. 6A, the shoulder 178 extends from the inner surface 110 of wall 104 toward the outer surface 112 thereof and terminates at a further upwardly extending inner surface 111 of the wall 104. Centrally disposed in the shoulder 178 at the juncture with surface 111 is a longitudinally extending recess 180 having a semi-circular configuration. An end wall 182 of the recess 180 is formed of the material of wall 104 and is chordally disposed with respect to a cylindrical aperture 184 axially aligned with the recess 180 and extending through the wall 104. At the outer surface 112 of wall 104 the aperture 184 is encircled by an externally threaded collar 186 projecting axially outward from a circular recess 188 in the outer surface 112 of wall 104.

Figure 9:
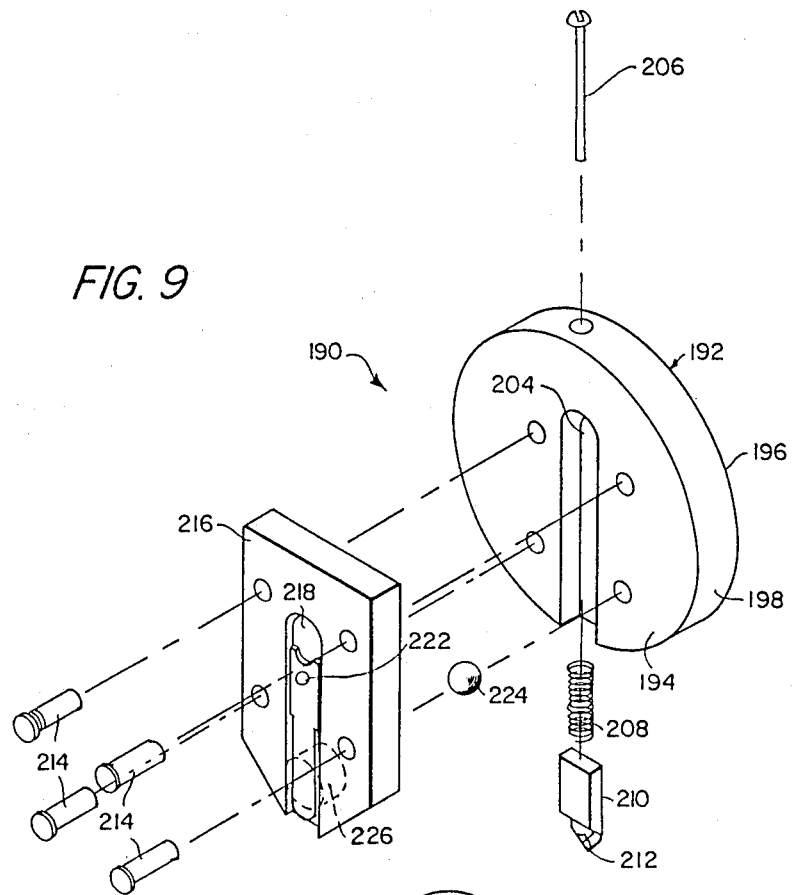
FIG. 9 is an isometric exploded view of the optical fiber cutter means shown in FIGS. 5 and 6.

Above the circular recess 188 in outer surface 112, the wall 104 may be provided with an outwardly extending end portion 113 for supporting a rotatable cleaning means comprising cutter 190 on the inner surface 111 above the semi-circular recess 180 in shoulder 178. As shown more clearly in FIG. 9, the cutter 190 comprises a solid cylindrical disc 192 having opposing flat surfaces, 194 and 196, respectively, and a circular peripheral surface 198. Disc 192 is made of rigid material, such as steel, for example, and has extending axially from the surface 196 an integral axle 200 which is rotatably supported in the end portion 113 of wall 104. The distal end portion of axle 200 is tubular and threaded internally for engagement with suitable fastening means, such as a bolt 202, for example, extended therein from the outer surface of end portion 113. Thus, the axle 200 rotatably supports disc 190 with its flat surface 196 adjacent the inner surface 111 of wall 104.

Disposed in the opposing flat surface 194 of disc 192 is an open-sided slot 204 which extends diametrically of the disc 192. Slot 204 has an open end in a radially aligned portion of the peripheral surface 198, and has an opposing closed end disposed adjacent a diametrically aligned marginal portion of the disc 192 through which an adjustment screw 206 is threaded from the peripheral surface 198. The adjustment screw 206 has a shank end portion extended axially into the closed end portion of slot 204 and encircled by an end portion of a coil spring 208. Coil spring 208 extends axially along the slot 204 and has an opposing end portion bearing against a flat end surface of a wafer-like blade 210 which is slidably disposed in the slot 204. The blade 210 has a thickness significantly less than the thickness of slot 204 and has an opposing pointed end portion 212 provided with a diamond tip. Thus, the screw 206 is adjusted for causing the spring 208 to exert an axially directed pressure on the slidable blade 210 such that the diamond tipped end portion 212 of blade 210 protrudes from the peripheral surface 198 of disc 192 a predetermined distance.

Overlying the open side of slot 204 and mounted, as by screws 214, for example, on the surface 194 of disc 192 is a pentagonal plate 216 having a transversely tapered end portion disposed over the open end of slot 204. Plate 216 is made of rigid material, such as a suitably hard plastic material, for example, and has disposed in its outer surface a shallow slot 218 which overlies the slot 204 and has a similar configuration. Thus, the slot 218 has an open side in the outer surface of plate 216, an open end overlying the open end of slot 204, and an opposing closed end disposed adjacent the closed end of slot 204.

Longitudinally disposed in the slot 218 is an elongated leaf-spring 220 made of resilient material, such as spring-steel, for example. Leaf-spring 220 has an end portion disposed adjacent the closed end of slot 218 and affixed, as by a screw 222, for example, to the material of plate 216. The leaf-spring 220 has adjacent the open end of slot 218 a flexible end portion which presses against a spherical ball 224 disposed in an aperture 226 having a slightly larger diameter and extending through the thickness of plate 216. Ball 224 is made of rigid material, such as steel, for example, and has a diameter approximately equal to or slightly greater than the thickness of plate 216 plus the difference between the thickness of the slot 204 and the thickness of blade 210. As a result, the ball 224 presses on the adjacent surface of blade 210 to hold the opposing surface thereof slidably against the adjacent closed surface of slot 204. As shown clearly in FIG. 6A, the surface of blade 210 adjacent the closed side of slot 204 is provided with a rake angle with respect to the transverse end surface 182 of circular recess 180 in shoulder 178. Consequently, the diamond tipped end portion 212 of blade 210 is disposed laterally closer to the inner wall surface 111 by a small amount, such as one to four thousandths of an inch, for example, than the transverse end surface 182 of circular recess 180.

In FIGS. 11A–11D, there is shown a method for using the tool 100 to cleave the optical fiber end portion 90 extending from the ferrule 26 of connector assembly 20 shown in FIG. 1. As shown in FIG. 11A, the diamond tipped end portion 212 protruding from the peripheral surface 198 of disc 192 is rotated out of proximity with the shoulder 178 of wall 104. Also, the positive-stop adjustment screw 146 is threaded into end portion 108 of base 102 to bring the projecting forward end portion 139 of sled 130 into butting relationship with the inner surface 110 of wall 104. Then, the optical fiber end portion 90 is passed axially through the aperture 184 in wall 104 and over the surface of shoulder 178 which is chordally disposed with respect to the aperture 184. The ferrule 26 of connector assembly 20 is inserted slidably into the aperture 184; and the coupling end portion 28 of connector shell 22 is threaded onto the collar 186 encircling the outer end portion of aperture 184. As a result, the tubular end portion 64 of ferrule 26 is urged axially into the circular recess 180 until the circular rim 84 of dish-shaped end surface 78 abuts the transverse end wall 182 of recess 180.

As shown in FIG. 11B, the optical fiber end portion 90 extending from ferrule 26 is inserted into the V-shaped notch 164 and laid longitudinally in the groove 166 on raised level surface portion 148 which is substantially coplanar with the surface of shoulder 178. Then, the clamping adjustment screw 159 extending through the aperture 158 in clamping plate 156 is threaded into the aligned aperture 170 in the raised level surface portion 148 to pivot the clamping plate 156 downward toward the raised level surface portion 148. As a result, the pad 161 is clamped between the plate 156 and the raised level surface portion 148 to compress the material of pad 161 around the optical fiber end portion 90 in groove 166 and hold it firmly in place.

As shown in FIG. 11C, the positive-stop adjustment screw 146 then is backed off to permit the coil spring 142 to slide the sled 130 away from the inner surface 110 of wall 104 and maintain the optical fiber end portion 90 extending from ferrule 26 under tension. The tensile force exerted on the clamped optical fiber end portion 90 by the spring 142 may be adjusted by threading the screw 140 into or out of end portion 106 of base 102. The disc 192 of cutter 190 then is rotated to bring the diamond tipped end portion 212 of blade 210 protruding from the peripheral surface 198 of disc 192 into nicking relationship with the optical fiber end portion 90 at a transverse plane adjacent the end wall 182 of circular recess 180.

As shown in FIG. 11D, the sled 130 is moved, such as digitally by the operator, for example, away from the inner surface 110 of wall 104 until stopped by the terminal end of positive-stop adjustment screw 146 butting against the end surface 137 of runner 136. Thus, the remaining optical fiber end portion 90 protruding from the ferrule 26 is provided with a mirror-flat end surface suitable for efficiently transmitting light into or out of the optical fiber end portion 70.

Figure 6A:
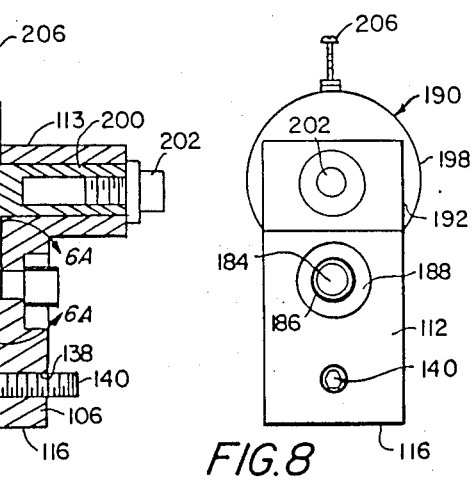
FIG. 6A is an enlarged fragmentary view of the optical fiber cutter means in operative relationship with respect to the ferrule positioning means shown in FIG. 6.
Figure 6:
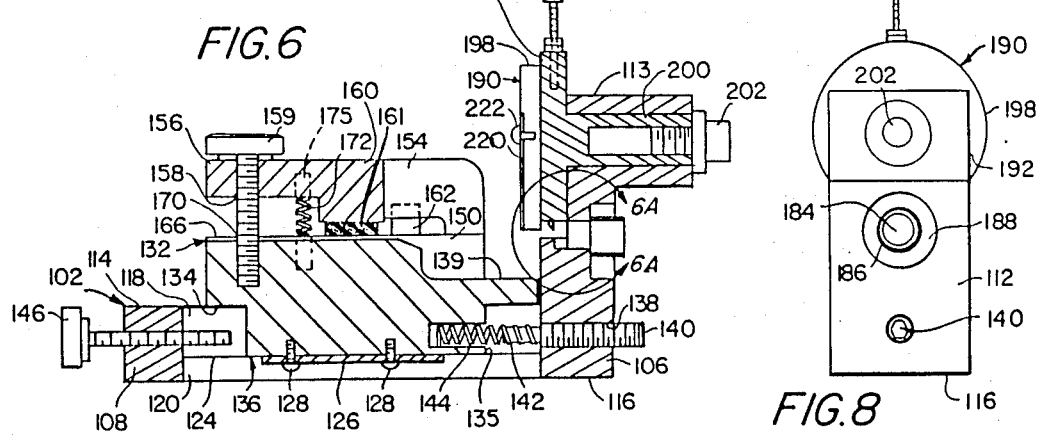
FIG. 6 is an axial sectional view of the cleaving tool shown in FIG. 5.
Figure 8:
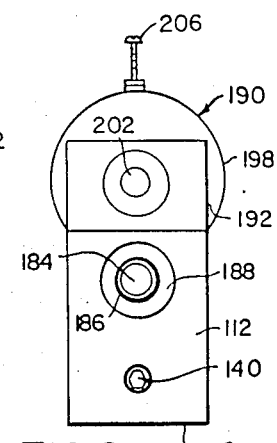
FIG. 8 is an elevational end view of the cleaving tool shown in FIGS. 5 and 6.
Figure 7:
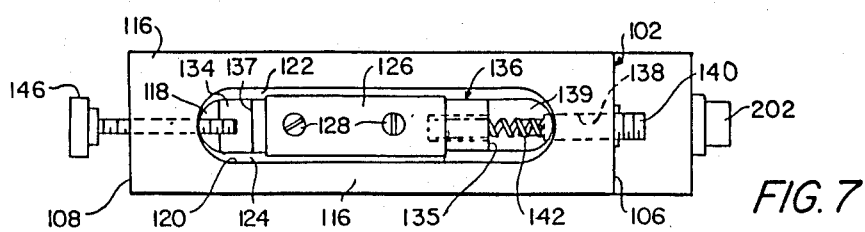
FIG. 7 is a bottom plan view of the cleaving tool shown in FIGS. 5 and 6.
Figure 12A:
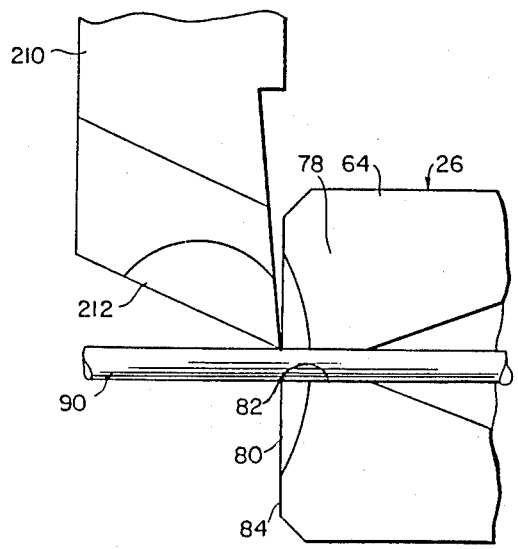
FIGS. 12a–12b are schematic fragmentary views showing the action of the optical fiber cutter means illustrated in FIG. 11c when moving over the circular rim of a dish-shaped end surface of the ferrule.
Figure 12B:
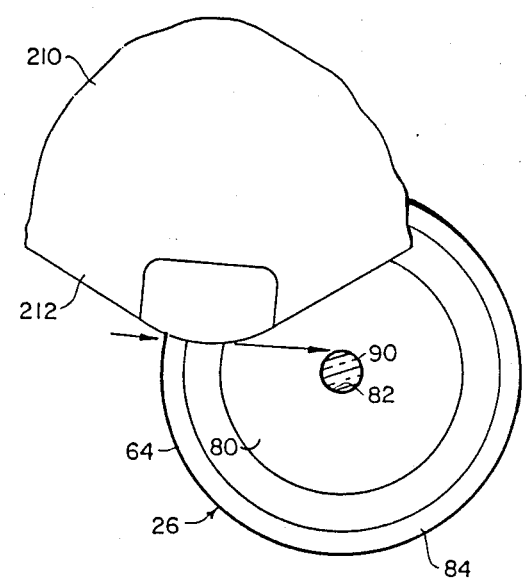

As pointed out in connection with FIG. 6A, the diamond tipped end portion 212 of blade 210 is disposed at a rake angle with respect to the transverse end wall 182 of circular recess 180 in shoulder 178 so that the diamond tipped end portion 212 is disposed slightly closer to the inner surface 111 of wall 104 than the end wall 182. As described in connection with FIGS. 11A-11D, the connector assembly 20 is mounted on the wall 104, such that the circular rim 84 of dish-shaped end surface 80 is abutting the transverse end wall 182 of circular recess 180; and the cutter disc 192 is rotated to bring the diamond tipped end portion 212 of blade 210 into nicking engagement with the optical fiber end portion 90. As shown in FIGS. 12a and 12b, when the cutter disc 192 is rotated, the diamond tipped end portion 212 of blade 210 first comes into interference contact with the circular rim 84 which abuts the transverse end wall 182 of circular recess 180. Consequently, the diamond tipped end portion 212, which is thinner than the slot 204, is pressed laterally against the ball 224 and causes the free end portion of leaf-spring 220 to flex laterally out of the slot 218 until the diamond tipped end portion comes into contact with the plate 216. As a result of this slight lateral movement, such as one to four thousandths, for example, the diamond tipped end portion 212 of blade 210 is enabled to clear the circular rim 84 and move into the concavity of dish-shaped end surface 80.

Figure 13A:
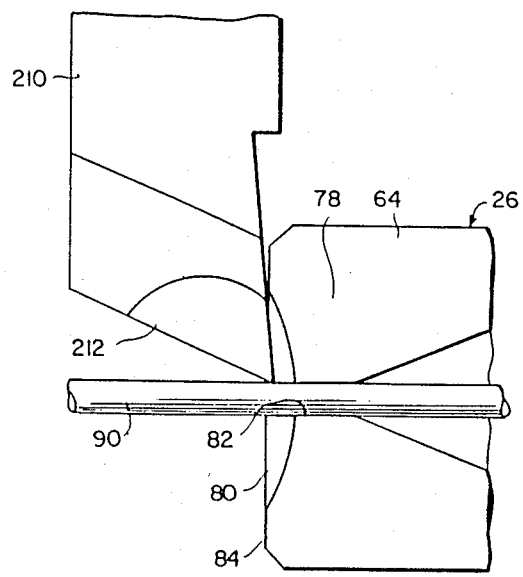
FIGS. 13a–13b are schematic fragmentary views similar to FIGS. 12a–12b but showing the action of the cutter means when nicking a glass optical fiber at a transverse plane within the concavity of the dish-shaped ferrule end surface.
Figure 13B:
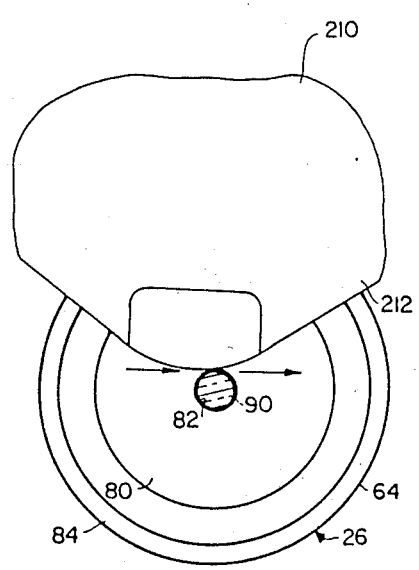

As shown in FIGS. 13a and 13b, inside the concavity of dish-shaped end surface 80, the diamond tipped end portion 212 of blade 210 moves laterally toward the central aperture 82 in the dish-shaped end surface 80 because the resilient material of leaf-spring 220 causes the free end portion thereof to flex laterally back into the slot 218 and press the ball 224 against the adjacent surface of blade 210. As a result of the diamond tipped end portion 212 of blade 210 being moved laterally closer to the central aperture 82, the optical fiber end portion 90 extending axially through the aperture 82 is nicked at a transverse plane disposed closer to the central aperture 82 than the plane defined by circular rim 84. Consequently, when the optical fiber end portion 90 breaks transversely at the nicked portion, it is provided with a resulting mirror-flat terminal end surface which is disposed axially closer to the central aperture 82 than the circular rim 84 by the amount of axial distance which the diamond tipped end portion 212 of blade 210 travels laterally after clearing the rim 84. Accordingly, the circular rim 84 being spaced a greater axial distance from the central aperture 82 than the mirror-flat terminal end surface of optical fiber end portion 90 serves as an integral spacer means for spacing a surface of an optically coupled component abutting the rim 84 from the mirror-flat terminal end surface of optical fiber end portion 90.

As shown in FIGS. 14A and 14B, the optical fiber cleaving tool 100 may be used with other types of fiber optic connectors assemblies, such as fiber optic connector assembly 230, for example. The connector assembly 230 comprises a cup-shaped connector shell 232 and an axially disposed ferrule 234 having protruding from the open end of the cup-shaped shell 232 an end portion 236 which terminates in a substantially flat end surface 238. Centrally disposed in the end surface 238 is an aperture 240 having protruding therefrom a bare optical fiber end portion 242 which extends through an axial bore 244 disposed the entire length of ferrule 234. The end portion 236 disposed within the shell 232 is encircled by an axial wall 246 thereof which is internally threaded. End portion 236 is integrally joined to one end of a larger diameter portion 248 which terminates at its other end in an integral annular flange 250 extending radially outward of the ferrule 234. The flange 250 is disposed for butting engagement with a radially extending bottom wall 252 of the cup-shaped shell 232.

The flange 250 of ferrule 234 is integrally joined to one end a smaller diameter portion 254 thereof which extends axially through a central aperture 256 in the bottom wall 252 of shell 232. Externally of the cup-shaped shell 232, the portion 254 of ferrule 234 is provided with an annular surface groove 257 having disposed therein a retaining ring 258. Ring 258 limits sliding movement of the bottom wall 252 away from the flange 250 of ferrule 234. The portion 254 of ferrule 234 has an opposing end integrally joined to one end of a still smaller diameter end portion 260 which has a knurled outer surface. Crimped onto the knurled outer surface of the portion 260 is a sleeve 262 which also is crimped onto an insulated coated end portion 264 of fiber optic cable 266 having an outer diameter approximately equal to the knurled outer surface of ferrule portion 260.

In assembly, the fiber optic cable end portion 264 has slipped onto it the sleeve 262, the retaining ring 258 and the connector shell 232. The cable end portion 264 is stripped, in a manner similar to stripping an electrical cable, to provide the bare optical fiber end portion 242 which then is inserted into the axial bore of ferrule 234 until the knurled surface end portion 260 of ferrule 234 abuts the insulation coating of cable end portion 264. The optical fiber end portion 242 may be fixedly attached to the ferrule 234 by suitable means, such as glass epoxy adhesive material, for example, and extends out of the central aperture 240 in the substantially flat end surface 238 of ferrule 234. The connector shell 232 then is slid along the cable end portion 264 and ferrule 234 until the bottom wall 252 abuts the flange 250 of ferrule 234; and the retaining ring 258 is worked along the outer surface of ferrule portion 254 until it is disposed in the annular groove 256. Finally, the crimping sleeve 262 is slid over the knurled outer surface of ferrule portion 260 and the abutting insulation coating of cable end portion 264. Sleeve 262 then may be crimped in a well-known manner to attach the ferrule 234 securely to the insulation coating of cable end portion 264.

Thus, the end portion 236 of ferrule 234 may be inserted into the aperture 184 in wall 104 of tool 100, and the connector shell 232 may be threaded onto the collar 186. As a result, the bottom wall 252 of shell 232 bears against the flange 250 of ferrule 234 and urges the end portion 236 thereof into the circular recess 180 until the substantially flat surface 238 abuts the transverse end wall 182. The optical fiber end portion 242 extending through the central aperture 240 then may be installed in the clamping means of sled 130 and tensioned as described in connection with optical fiber end portion 90. Then, the disc 192 of cutter 190 is rotated to bring the diamond tipped end portion 212 of blade 210 into nicking relationship with the optical fiber end portion 242. As a result, the diamond tipped end portion 212 of blade 210 initially comes into interference contact with the rim of end surface 238 and is deflected laterally, as described, to move grazingly over the substantially flat end surface 238 and nick the optical fiber end portion 242 at a transverse plane approximately coinciding with the plane of end surface 238. Consequently, when the optical fiber end portion 242 breaks at the nicked portion, it is provided with a mirror-flat terminal end surface which is substantially flush with the end surface 238 of ferrule 234. Thus, it may be seen that the cleaving tool 100 may be used with other types of fiber optic connector assemblies for cleaving an optical fiber end portion extending from a terminal end surface of the connector. As a result, the optical fiber end portion is provided with a mirror-flat terminal end surface suitable for efficiently transmitting light into and out of the optical fiber end portion.

Figure 15:
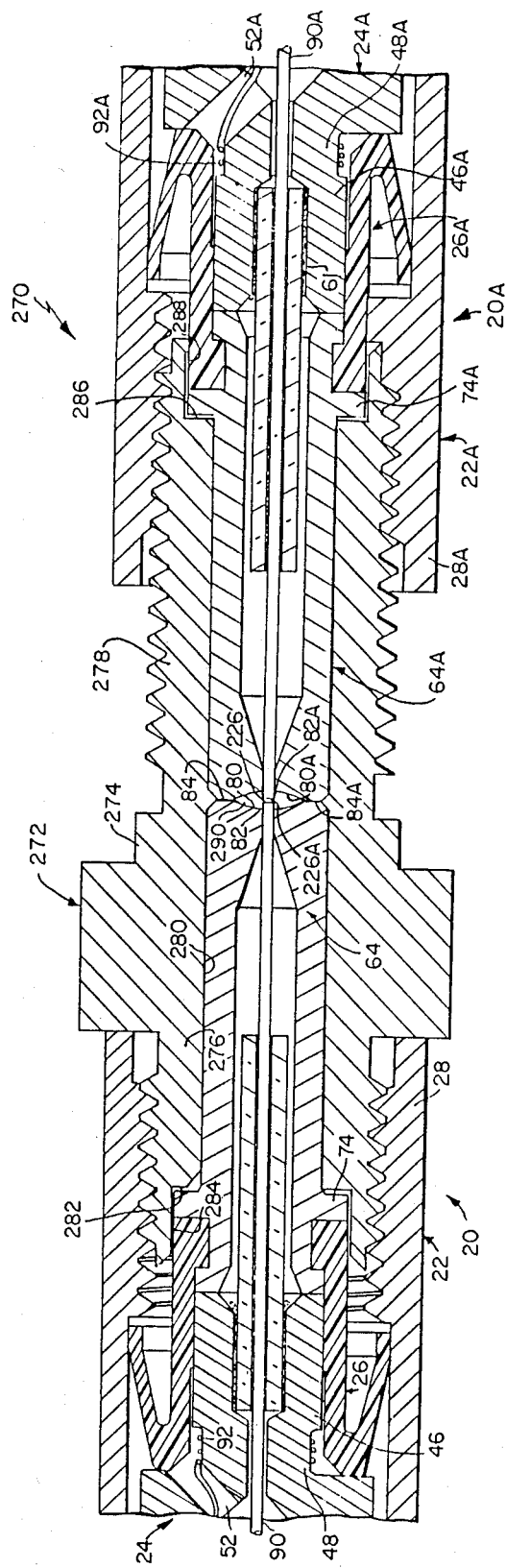
FIG. 15 is an axial view, partly in section, of a fiber optic coupler forming a junction of two fiber optic connector assemblies similar to the fiber optic connector assembly shown in FIG. 1.

In FIG. 15, there is shown a fiber optic junction assembly 270 comprising a tubular coupler device 272 having a midportion 274 which integrally joins opposing open end portions, 276 and 278, respectively, which are externally threaded. Within coupler device 272, there is an axial bore 280 terminating in the end portion 276 at an annular shoulder 282 where it communicates with a larger diameter cavity 284 having an opposing open end forming the entrance to end portion 276. Also, the axial bore 280 terminates in the end portion 278 at an annular shoulder 286 where it communicates with a larger diameter cavity 288 having an opposing open end forming the entrance to end portion 278.

Coupled to the end portion 276 of device 272 is the fiber optic connector assembly 20 having the optical fiber end portion 90 protruding from the central aperture 82 in dish-shaped end surface 80 and terminating in the mirror-flat end surface 226, as described. The tubular portion 64 of ferrule 26 is inserted through cavity 284 and slidably engages the wall of axial bore 280 while the coupling end portion 28 of connector shell 22 is threaded onto the external surface of end portion 276 until the flange 74 of tubular portion 64 abuts the internal annular shoulder 282. As a result, the cup-like portion 62 of ferrule 26 slidably enters the cavity 284 and the dish-shaped end surface 80 is disposed in the midportion 272 of the coupler device 272.

Similarly, coupled to the end portion 278 of device 272 is a fiber optic connector assembly 20A which is of the same type as fiber optic connector assembly 20 and also has an optical fiber end portion 90A protruding from a central aperture 82A in a dish-shaped end surface 80A and terminating in a mirror-flat end surface 226A. Fiber optic connector assembly 20A has a ferrule 26A with a tubular portion 64A slidably inserted into the axial bore 280, and a connector shell 22A with a coupling end portion 28A threaded onto the end portion 278 of coupler device 272. As a result, the cup-like portion 62A of ferrule 26A slidably enters the cavity 288 and the dish-shaped end surface 80A extends into the midportion 274 of coupler device 272.

In the midportion of axial bore 280, the connector assemblies 20 and 20A have their respective dish-shaped end surfaces 80 and 80A disposed in opposing relationship, and have their respective circular rims 84 and 84A abutting one another. Consequently, the respective optical fiber end portions 90 and 90A protruding from the central apertures 82 and 82A, respectively, have their respective mirror-flat end surfaces 226 and 226A disposed in alignment with one another within an enclosure 290. The enclosure 290 may have the configuration of a biconvex lense due to the two dish-shaped surfaces, 80 and 80A, respectively, being disposed in opposing relationship, and having their circular rims, 84 and 84A, respectively, abutting one another.

Thus, the biconvex enclosure 290 provides means for efficiently transmitting light from one to the other of the optical fiber end portions, 90 and 90A, respectively. The respective circular rims 84 and 84A may have their contacting surfaces coated with a material (not shown) suitable for further sealing the enclosure 290 such that light does readily enter or leave the enclosure 290 by way of the abutting rim surfaces, 84 and 84A, respectively. Also, the dish-shaped surfaces, 80 and 80A, may be polished to a mirror-like smoothness for reflecting light within the enclosure 290. Also, the dish-shaped surfaces 80 and 80A may be provided with respective curved configurations, such as parabolic or hyperbolic, for example, to focus light escaping from the optical fiber end portions, 90 and 90A, respectively, as desired within the enclosure 290. Alternatively, the dish-shaped end surfaces may be provided with suitable surface finishes, such as matte finishes, for example, or may be coated (not shown) with light absorbing material to minimize the effects of light escaping from the optical fiber end portions, 90 and 90A, respectively.

From the foregoing, it will be apparent that all of the objectives of this invention have been achieved by the structures and methods shown and described herein. It also will be apparent, however, that various changes may be made by those skilled in the art without departing from the spirit of the invention as expressed in the appended claims. It is to be understood, therefore, that all matter shown and described is to be interpreted as illustrative rather than in a limiting sense.

What is claimed is:

1. An optical fiber cleaving tool comprising:

means for securing in a predetermined position on the tool a fiber optic connector end surface having therein an aperture from which protrudes an optical fiber end portion; and means for cleaving said optical fiber end portion at a transverse plane disposed in predetermined positional relationship with respect to said aperture in said end surface of the fiber optic connector, said cleaving means including resilient biasing means for urging said cleaving means into resilient contacting relationship with said fiber optic connector end surface.

2. An optical fiber cleaving tool as set forth in claim 1 wherein said securing means includes coupling means for engaging said fiber optic connector.

3. An optical fiber cleaving tool as set forth in claim 1 wherein said securing means includes a shoulder portion of the tool having a first surface disposed for butting engagement with a portion of said end surface of the fiber optic connector.

4. An optical fiber cleaving tool as set forth in claim 3 wherein said shoulder portion of the tool comprises a second surface disposed orthogonally with respect to said first surface for underlying said optical fiber end portion protruding from said aperture.

5. An optical fiber cleaving tool as set forth in claim 1 wherein said cleaving means includes optical fiber cutter means supported for movement in said transverse plane for nicking engagement therein with said optical fiber end portion.

6. A optical fiber cleaving tool as set forth in claim 5 wherein said optical fiber cutter means includes a blade having an optical fiber scoring end portion and said resilient biasing means is connected to said blade.

7. An optical fiber cleaving tool as set forth in claim 6 wherein said resilient biasing means includes longitudinal biasing means for urging said blade longitudinally into nicking relationship with optical fiber end portion.

8. An optical fiber cleaving tool as set forth in claim 7 wherein said resilient biasing means includes lateral biasing means for urging said optical fiber scoring end portion of said blade laterally into grazing engagement with at least a portion of said end surface of the fiber optic connector.

9. An optical fiber cleaving tool as set forth in claim 1 wherein said cleaving means includes means for exerting an axial tension on said optical fiber end portion.

10. An optical fiber cleaving tool as set forth in claim 9 wherein said tension exerting means includes clamping means for holding said optical fiber end portion.

* * * * *